US012585722B2

(12) United States Patent
Ikeda

(10) Patent No.: US 12,585,722 B2
(45) Date of Patent: Mar. 24, 2026

(54) IMAGE GENERATION SYSTEM, COMMUNICATION APPARATUS, METHODS OF OPERATING IMAGE GENERATION SYSTEM AND COMMUNICATION APPARATUS, AND STORAGE MEDIUM

(71) Applicant: CANON KABUSHIKI KAISHA, Tokyo (JP)

(72) Inventor: Atsushi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 18/335,832

(22) Filed: Jun. 15, 2023

(65) Prior Publication Data

US 2023/0409660 A1 Dec. 21, 2023

(30) Foreign Application Priority Data

Jun. 21, 2022 (JP) ................................ 2022-099798

(51) Int. Cl.
*G06F 16/957* (2019.01)
*G06F 16/958* (2019.01)

(52) U.S. Cl.
CPC ........ *G06F 16/9577* (2019.01); *G06F 16/958* (2019.01)

(58) Field of Classification Search
CPC ... G06F 16/9577; G06F 16/958; G06F 16/168
See application file for complete search history.

(56) References Cited

U.S. PATENT DOCUMENTS 8,274,529 B1 * 9/2012 Butler .................. G06F 40/103 345/619
10,210,172 B1 * 2/2019 Konig .................... H04L 67/06
11,709,804 B1 * 7/2023 Korepanov ........... G06F 16/164 707/822
2006/0248442 A1 * 11/2006 Rosenstein ........... G06F 16/958 715/255

(Continued)

FOREIGN PATENT DOCUMENTS

JP 2012038094 A 2/2012

OTHER PUBLICATIONS

Hong-bin Yu, "Dispersing cloud and system", published on Apr. 6, 2018, Document ID: CN-107888629-A, pp. 7 (Year: 2018).*

(Continued)

*Primary Examiner* — Chau T Nguyen
(74) *Attorney, Agent, or Firm* — Canon U.S.A., Inc. IP Division

(57) ABSTRACT

An image generation system capable of communicating with a communication apparatus, the image generation system includes one or more memories, and one or more processors in communication with the one more memories, wherein the one or more processors and the one more memories are configured to receive an operation instruction with respect to a web page from the communication apparatus, transmit, to the communication apparatus, predetermined information when the operation instruction is a press for file selection, receive a file transmitted from the communication apparatus based on the predetermined information, reflect information of the file in the web page and generate a rendering result, and transmit the rendering result to the communication apparatus.

3 Claims, 10 Drawing Sheets

(56) References Cited

U.S. PATENT DOCUMENTS

| | | | | |
|---|---|---|---|---|
| 2009/0241110 | A1* | 9/2009 | Heo | G06F 9/45537 718/1 |
| 2009/0309893 | A1* | 12/2009 | Boothroyd | G06F 16/972 345/581 |
| 2011/0320411 | A1* | 12/2011 | Henderson | G06F 16/27 707/687 |
| 2013/0179947 | A1* | 7/2013 | Kline, III | H04L 63/0892 726/4 |
| 2014/0108956 | A1* | 4/2014 | Varenhorst | G06F 16/958 715/748 |
| 2015/0378558 | A1* | 12/2015 | Smith | G06F 3/0488 715/777 |
| 2016/0253513 | A1* | 9/2016 | Dowling | H04W 40/20 726/7 |
| 2020/0201937 | A1* | 6/2020 | Frid-Nielsen | G06F 40/14 |
| 2022/0374535 | A1* | 11/2022 | Jagasia | G06F 21/604 |
| 2023/0007016 | A1* | 1/2023 | Azulay | H04L 63/1416 |

OTHER PUBLICATIONS

Shoji Koichiro, “Electronic Data Management Method, Electronic Data Management Device, and Program and Storage medium for the same”, published on Nov. 1, 2021, Document ID: JP-2021174432-A, pp. 25 (Year: 2021).*

* cited by examiner

FIG. 5A

```
//ASSUME THAT COORDINATES OF PRESS OF USER IS (x, y)
var element = document.getElementFromPoint(x, y);
var tagName = element.tagName;
var typeName = element.type;
If (tagName == "input" && typeName == "file") {
  //PROCESSING FOR WHEN type IS file IN input ELEMENT
}
```

FIG. 5B

```
//NOTIFY INFORMATION OF USER OPERATION TO CLOUD AS HTTPS COMMUNICATION post DATA
//ALSO, INFORMATION OF ELEMENT PRESSED BY USER IS RETURNED AS RESPONSE
var webclient= require("request");
webclient.post({
  url: "https://www.cloudbrowser.conon",
  headers: {
   "content-type": "application/json"
 },
  //NOTIFY CLOUD THAT USER PRESSED (x, y)=(50, 20).
  body: JSON.stringify({type:click, x:50, y:20})
}, function (error, response, body){
  //THIS BLOCK IS FIRED WHEN THERE IS RESPONSE FROM CLOUD.
  //DETERMINATION RESULT OF ELEMENT IS RETURNED BEING STORED IN body OF ARGUMENT.
  //IF IT IS DETERMINED "FILE SELECTION" BY ANALYZING body IN HERE,
  //DISPLAY FILE SELECTION SCREEN.
});
```

FIG. 5C

```
// CALLBACK *FUNCTION TO BE FIRED AT TIME OF FILE SELECTION
static gboolean
fileChooser_cb(WebKitWebView *webView,
            WebKitFileChooserRequest *request,
            gpointer user_data)
{
  // INPUT FILE NAME RECEIVED FROM COMMUNICATION TERMINAL
  constgchar* filesToSelect[2] = { "dummy_file.txt", 0 };
  webkit_file_chooser_request_select_files(request, filesToSelect);
  return FALSE;
}
// REGISTER FILE SELECTION CALLBACK
g_signal_connect(target, "run-file-chooser",
                    G_CALLBACK(fileChooser_cb), target);
```

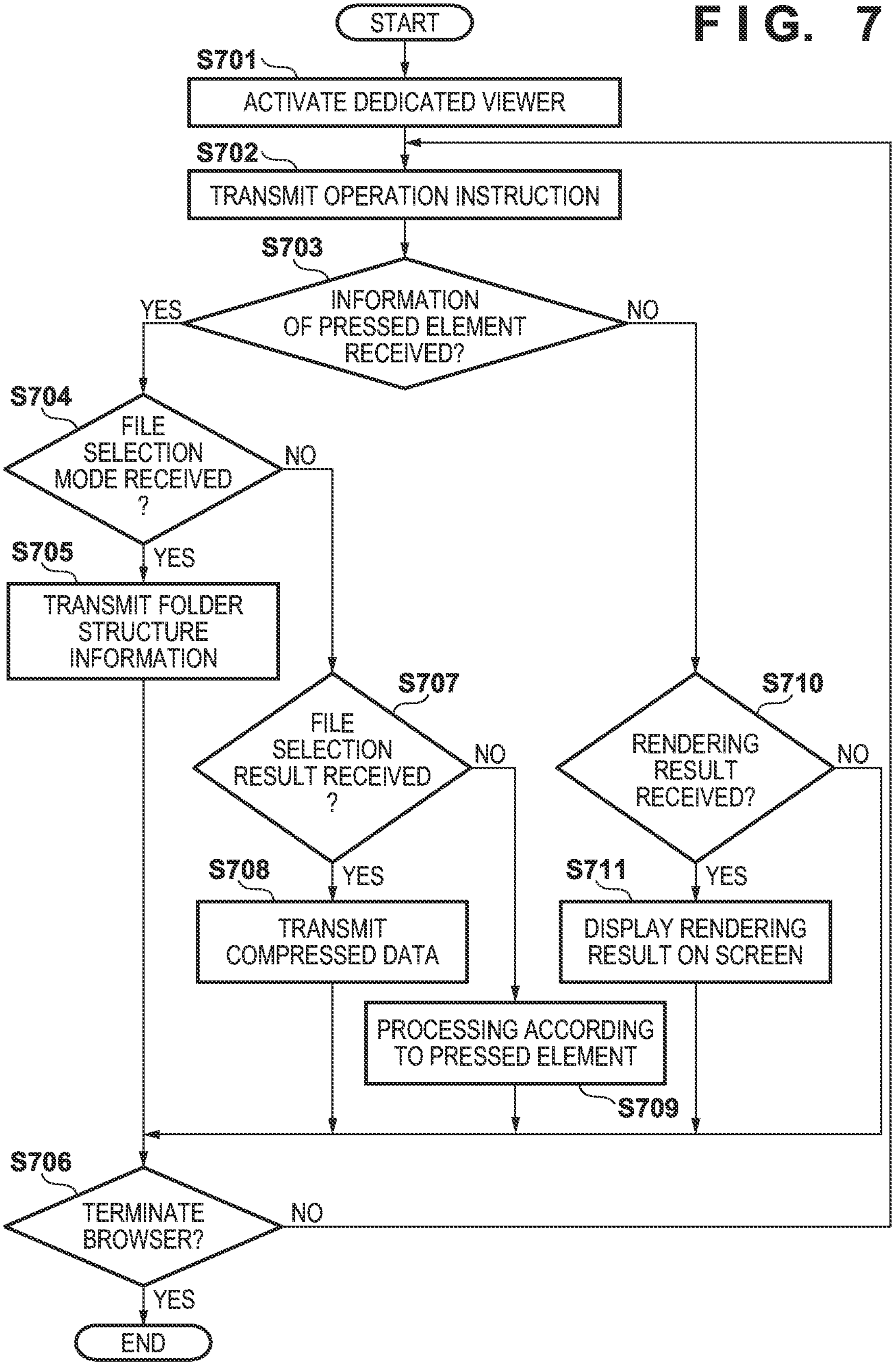

FIG. 7

START

S701 — ACTIVATE DEDICATED VIEWER

S702 — TRANSMIT OPERATION INSTRUCTION

S703 — INFORMATION OF PRESSED ELEMENT RECEIVED?

YES / NO

S704 — FILE SELECTION MODE RECEIVED?

NO

S705 — TRANSMIT FOLDER STRUCTURE INFORMATION

YES

S707 — FILE SELECTION RESULT RECEIVED?

NO

S708 — TRANSMIT COMPRESSED DATA

YES

S710 — RENDERING RESULT RECEIVED?

NO

S711 — DISPLAY RENDERING RESULT ON SCREEN

YES

PROCESSING ACCORDING TO PRESSED ELEMENT — S709

S706 — TERMINATE BROWSER?

NO

YES

END

| key | value | DESCRIPTION |
|---|---|---|
| Element | File | PRESSED ELEMENT IS FILE SELECTION ELEMENT |
| Element | Text | PRESSED ELEMENT IS CHARACTER STRING INPUT ELEMENT |
| Draw | [URL] | RENDERING RESULT |
| Mode | FileSelect | FILE SELECTION MODE |
| SelectedFile | [File Name] | FILE SELECTION RESULT |

IMAGE GENERATION SYSTEM, COMMUNICATION APPARATUS, METHODS OF OPERATING IMAGE GENERATION SYSTEM AND COMMUNICATION APPARATUS, AND STORAGE MEDIUM

BACKGROUND

Field

The present disclosure relates to an image generation system, a communication apparatus, a method of operating the image generation system and the communication apparatus, and a storage medium.

Description of the Related Art

Communication apparatuses equipped with a web browser (hereinafter referred to as a browser) and including a function for allowing viewing of a web page on the browser have become popular. The communication apparatuses can be linked to an external service by displaying a web page via the browser. For example, a browser can upload a file recognized by a communication apparatus to an external service.

One type of browser is called a cloud browser and is capable of generating a web page rendering result on a cloud server. The computational load of the communication apparatus is reduced by executing computationally intensive processing, such as web page analysis processing and execution processing, on the cloud server.

Japanese Patent Laid-Open No. 2012-38094 discloses that when a file selection element is present in screen information obtained from a web service, the element is converted into a select box that can be processed by the browser and a file downloaded from another web service that can be linked with the web service is set as an option of the select box.

However, when an image generation system operating as a cloud browser is present between the communication apparatus and the web service, a file on the communication apparatus that a user wants to view is not present on the image generation system. Therefore, there is a problem that the cloud browser operating on the image generation system cannot select a file on the communication apparatus.

SUMMARY

The present disclosure has been made in view of the above-described problem and provides a technique for allowing a user to select a file on a communication apparatus in an image generation system.

According to one aspect of the present disclosure, there is provided an image generation system capable of communicating with a communication apparatus, the image generation system includes one or more memories, and one or more processors in communication with the one more memories, wherein the one or more processors and the one more memories are configured to receive an operation instruction with respect to a web page from the communication apparatus, transmit, to the communication apparatus, predetermined information when the operation instruction is a press for file selection, receive a file transmitted from the communication apparatus based on the predetermined information, reflect information of the file in the web page and generate a rendering result, and transmit the rendering result to the communication apparatus.

Further features of the present disclosure will become apparent from the following description of exemplary embodiments with reference to the attached drawings.

BRIEF DESCRIPTION OF THE DRAWINGS

FIGS. 5A to 5C are diagrams illustrating examples of implementing processing according to the embodiment in a program.

FIG. 7 is a flowchart for explaining a flow of processing of the communication apparatus according to the second embodiment.

DESCRIPTION OF THE EMBODIMENTS

Figure 1:
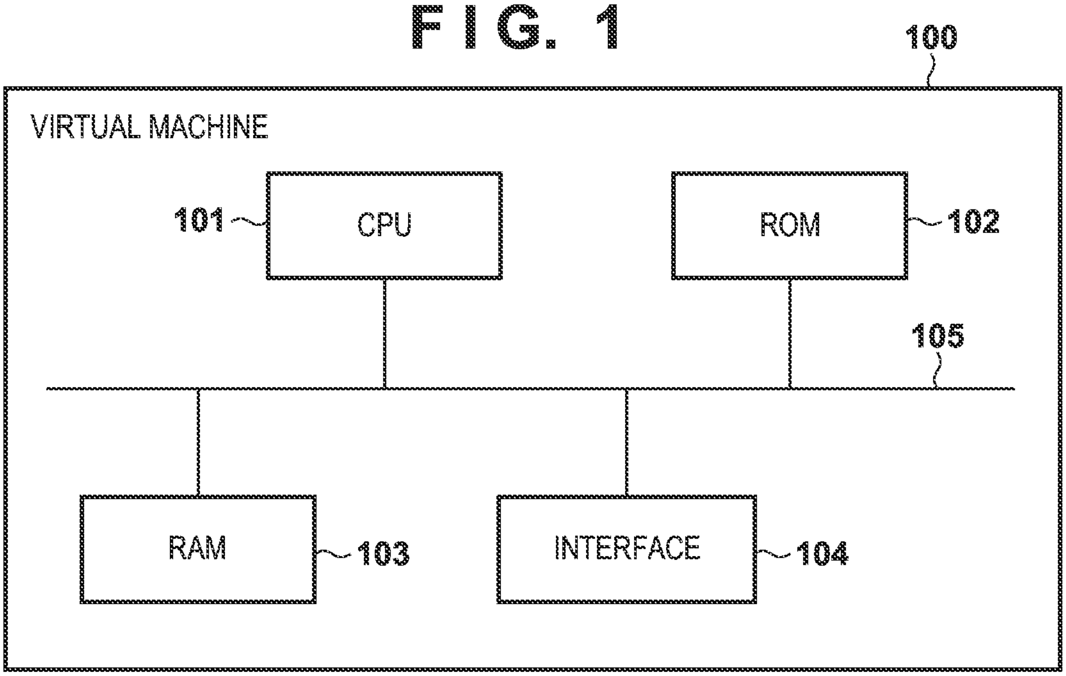
FIG. 1 is a diagram illustrating an example of a hardware configuration of a virtual machine according to an embodiment.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

First Embodiment

In the present embodiment, an example in which in an image generation system that functions as a cloud browser, file selection is completed using a file browsing function included in a remote communication apparatus, and the image generation system reflects file information in a web page will be described.

Hardware Configuration

An example of a hardware configuration of a virtual machine included in the image generation system according to an embodiment will be described with reference to a block diagram of FIG. 1. In FIG. 1, Reference numeral 101 is a central processing unit (CPU) for controlling a virtual machine 100 generally. Reference numeral 102 is a read-only memory (ROM) for permanently storing programs and parameters. Reference numeral 103 is a random access memory (RAM) for temporarily storing programs and data supplied from an external apparatus and the like. Reference numeral 104 is an interface for displaying stored data and supplied data. Reference numeral 105 is a system bus for connecting each of the units 101 to 104 so as to be capable of communication. There may be an interface or the like with a pointing device, such as a mouse, and an input device, such as a keyboard, for inputting data upon reception of an operation from a user. Further, there may be a hard disk, a memory card, and the like installed by being virtually fixed to the virtual machine 100. Alternatively, there may be an external storage apparatus or the like including an optical disk, such as a flexible disk (FD) or a compact disc (CD), a magnetic or optical card, an IC card, a memory card, and the like that can be virtually attached to and detached from the virtual machine 100. In addition, there may be a network interface or the like for connecting to a network line, such as the Internet.

The hardware configuration of the communication apparatus communicating with the image generation system can be configured in a similar manner as the hardware configuration of the virtual machine 100.

System Configuration and Software Configuration

Figure 2:
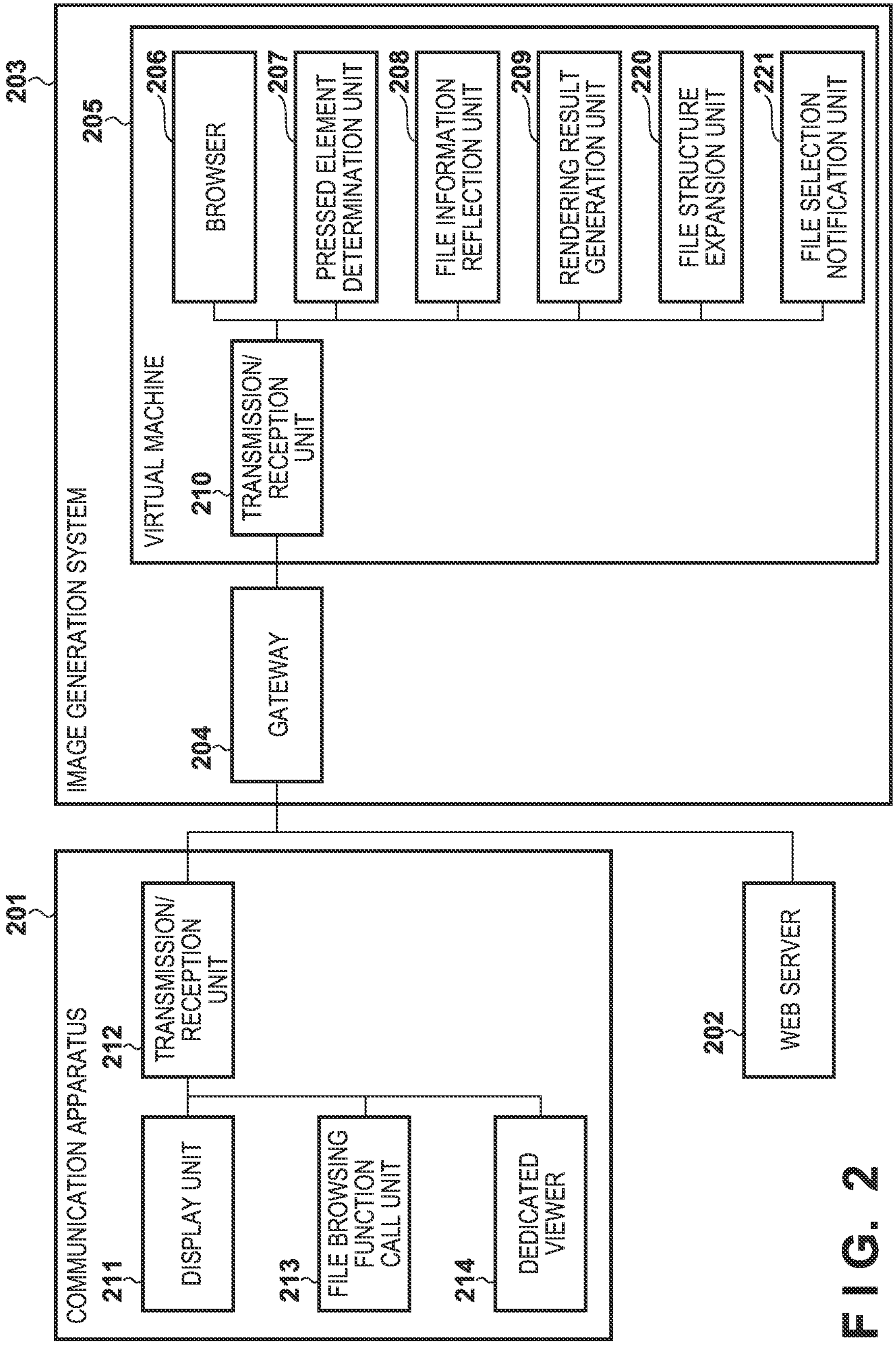
FIG. 2 is a diagram illustrating an example of a configuration of an image generation system and a communication apparatus according to the embodiment.

Next, an example of configurations of the image generation system that functions as a cloud browser and the communication apparatus according to the embodiment will be described with reference to FIG. 2. FIG. 2 is an example of a system configuration including a software configuration of each of the image generation system and the communication apparatus according to the embodiment.

In FIG. 2, Reference numeral 201 is a communication apparatus, Reference numeral 202 is a web server, and Reference numeral 203 is an image generation system. In the present embodiment, the image generation system 203 is, for example, a cloud browser.

The communication apparatus 201 includes a display unit 211, a transmission/reception unit 212, a file browsing function call unit 213, and a dedicated viewer 214. The display unit 211 displays various screens. The transmission/reception unit 212 transmits and receives various types of information. The file browsing function call unit 213 displays a file browsing screen, such as a screen 802 of FIG. 8B, which will be described later. The dedicated viewer 214 is capable of displaying a rendering result received from the image generation system 203 and of accepting the user's operation instruction.

The image generation system 203 includes a gateway 204 and a virtual machine 205. The virtual machine 205 is a representation of software functions of the virtual machine 100 illustrated in FIG. 1. The virtual machine 205 includes a browser 206, a pressed element determination unit 207, a file information reflection unit 208, a rendering result generation unit 209, a transmission/reception unit 210, a file structure expansion unit 220, and a file selection notification unit 221.

The browser 206 is a so-called browser engine that operates on the virtual machine 205 and performs analysis of HTML, JavaScript®, CSS, and the like and processing associated with a user operation and a communication event. The communication between the communication apparatus 201 and the virtual machine 205 and the communication between the web server 202 and the virtual machine 205 are performed via the gateway 204.

The pressed element determination unit 207 determines whether the user has pressed a file selection element included in a web page displayed in the browser 206 based on the user's operation instruction received from the communication apparatus 201. The file selection element is described by an expression, such as "<input type, 'file'>".

The file information presentation unit 208 reflects in a web page the information of a file selected using the file selection element. For example, an example of reflecting file information in a web page is the browser 206 displaying a file name selected by the user at a predetermined location in a web page.

The rendering result generation unit 209 performs display control for generating a rendering result to be displayed by the communication apparatus 201. The transmission/reception unit 210 transmits and receives various types of information. The file structure expansion unit 220 expands file structure information received from the communication apparatus 201 in the virtual machine 205. The file selection notification unit 221 transmits information of a pressed element to the communication apparatus 201 via the transmission/reception unit 210.

The user can view a desired web page via a screen of the display unit 211 of the communication apparatus 201. The communication apparatus 201 transmits URL information of a web page provided by the web server 202 to be viewed by the user to the image generation system 203 via the transmission/reception unit 212.

Next, the image generation system 203 accesses a web page provided by the web server 202 based on the URL information received from the communication apparatus 201 and generates a rendering result using the rendering result generation unit 209. Thereafter, when a request for obtaining a rendering result is received from the communication apparatus 201, the image generation system 203 transmits the generated rendering result to the communication apparatus 201 via the transmission/reception unit 210. The communication apparatus 201 receives the rendering result via the transmission/reception unit 212 and presents the rendering result to the user via the display unit 211.

Example of Web Standard Specification for Communication Apparatus

Figure 8A:
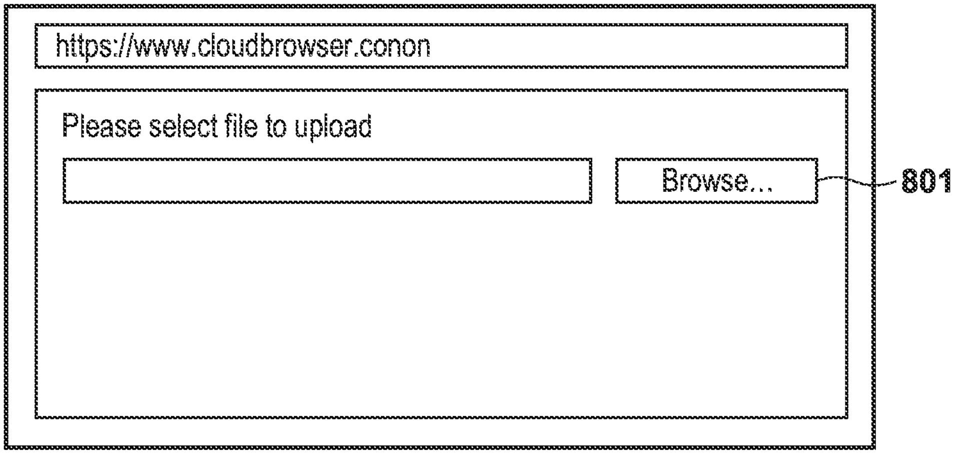
FIGS. 8A to 8C are diagrams illustrating examples of displaying a file selection element and a file browsing function according to the embodiment.
Figure 8B:
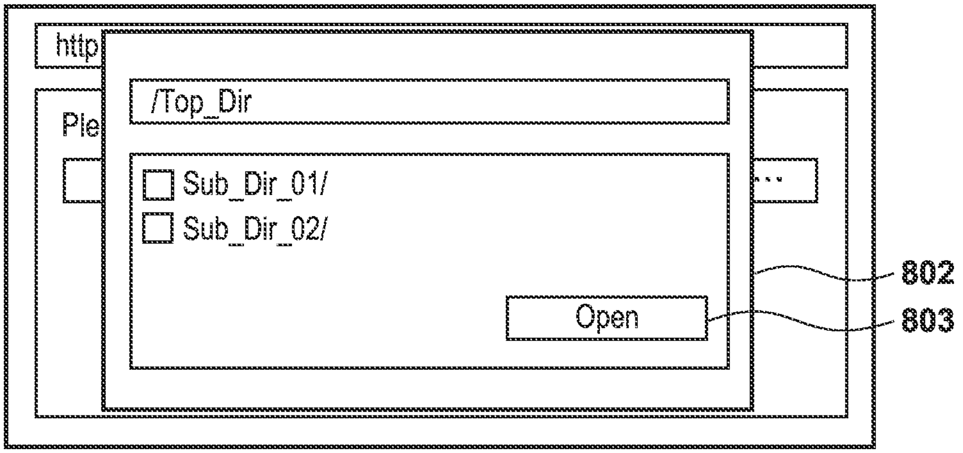
Figure 8C:
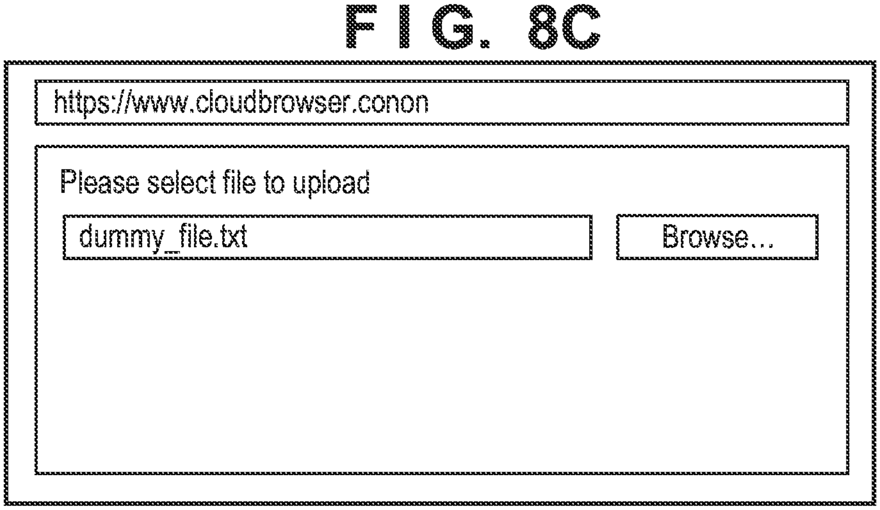

A file selection element based on a web standard specification and a display result according to the file browsing function will be described with reference to FIGS. 8A to 8C. FIG. 8A is an example of a web page including a file selection element. In the example of FIG. 8A, the file selection element is a button 801 labeled "Browse . . . ". When an embedded browser of the communication apparatus 201 determines that the user has pressed the button 801 by operating the communication apparatus 201, the file browsing function call unit 213 activates a file browsing function unique to the communication apparatus 201. FIG. 8B illustrates a result of calling the file browsing function. A reference numeral 802 is a file browsing screen. In the example of FIG. 8B, a Top_Dir folder is being displayed. It can be seen that a Sub_Dir_01 folder and a Sub_Dir_02 folder are presented in Top_Dir. Selection of a file is performed by selecting a desired folder or file and then pressing a button 803 labeled "Open". When the user selects a file on the file browsing screen 802 by operating the communication apparatus 201, a file name of the file selected by the user is displayed at a predetermined location as in FIG. 8C.

The following processing is performed such that the series of operations performed by the communication apparatus 201 can be performed also when the image generation system 203 is interposed.

Processing

Figure 3:
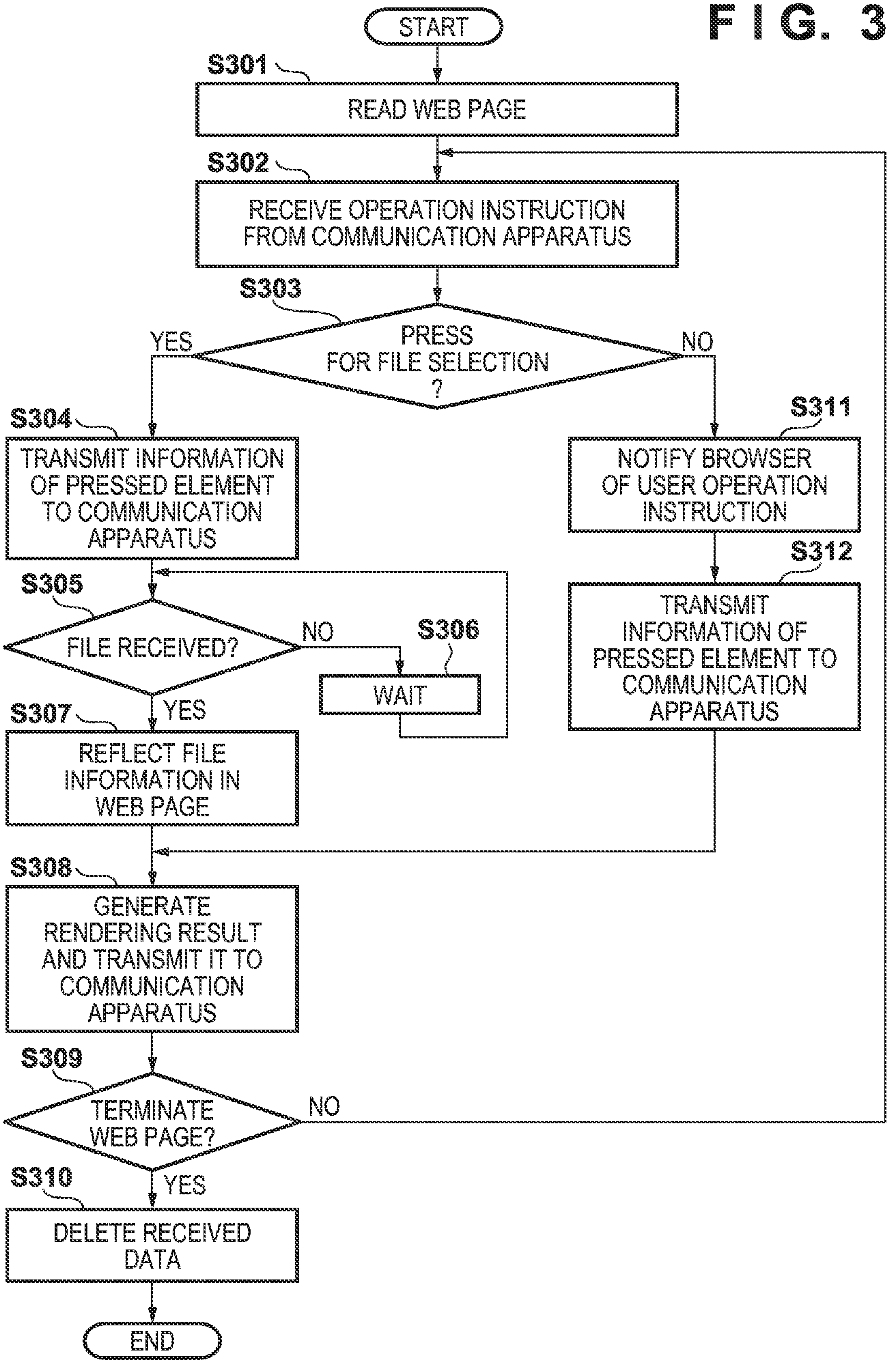
FIG. 3 is a flowchart for explaining a flow of processing of the image generation system according to a first embodiment.
Figure 4:
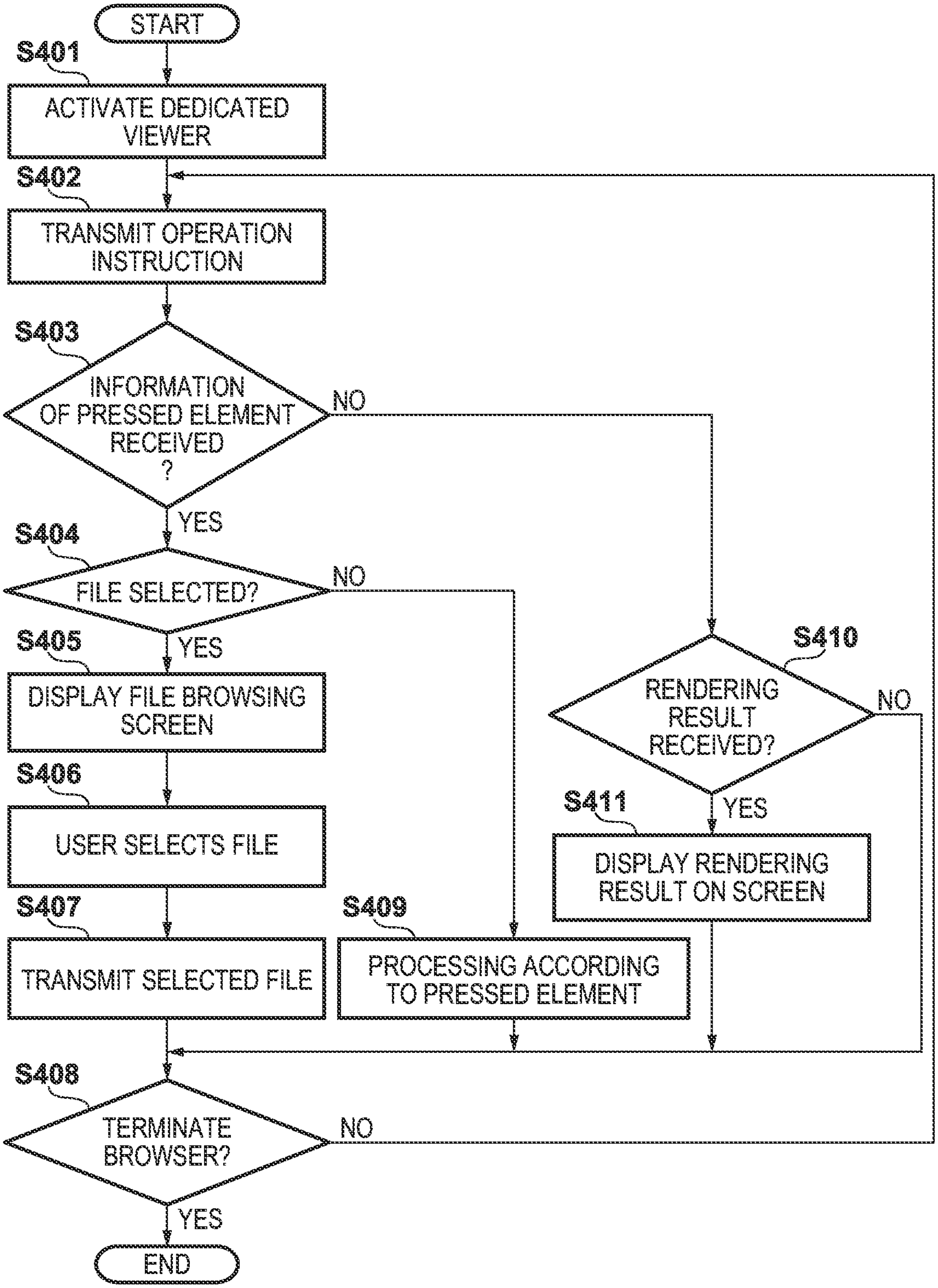
FIG. 4 is a flowchart for explaining a flow of processing of the communication apparatus according to the first embodiment.

FIGS. 3 and 4 are flowcharts for explaining processing according to the present embodiment. FIG. 3 is a flow of processing on the image generation system 203 side, and FIG. 4 is a flow of processing on the communication apparatus 201 side.

First, the flow of processing on the image generation system 203 side will be described with reference to FIG. 3. In step S301, the image generation system 203 reads a URL of a web page notified by the communication apparatus 201, generates a rendering result of the web page, and transmits the rendering result to the communication apparatus 201.

In step S302, the image generation system 203 receives the user's operation instruction notified by the communication apparatus 201 (instruction reception). The user's operation instruction includes information indicating an attribute of the operation, such as a "tap" operation of touching a screen of the communication apparatus 201 with a finger or a "key input" operation of pressing a key on a keyboard (not illustrated) provided in the communication apparatus 201. The user's operation instruction also includes information attached for each attribute of the operation, such as x and y coordinates indicating a position at which the user has touched the screen and a value of the key pressed by the user. The URL information of a web page and the operation instruction arrive at the browser 206 via the gateway 204 and the transmission/reception unit 210.

Here, a method of transmitting a user operation instruction from the communication apparatus 201 to the image generation system 203 according to the present embodiment will be described with reference to FIG. 5B. FIG. 5B is an example of a JavaScript program for storing user operation information in a body of an HTTP communication request. "webclient" of FIG. 5B is a structure for transmitting an HTTP communication request to a communication destination. The request destination can be specified by a URL component and a value is "'https://www.cloudbrowser-.canon'". The body of the request can be specified by a body component, and a value is "{type: click, x: 50, y: 20}". "type: click" indicates that a user operation is a click. In addition, "x: 50" indicates that an x-coordinate at which the user has performed a click is 50, and "y: 20" indicates that a y-coordinate at which the user performed a click is 20.

In step S303, the pressed element determination unit 207 determines whether an element pressed by the user using the communication apparatus 201 is a file selection element.

A method of determination in step S303 will be described with reference to FIG. 5A. FIG. 5A is an example of a JavaScript program for determining a file selection element. "document.getElementFromPoint(x, y);" is a function for extracting an element at x and y coordinates. With this, an element presents at a position (x, y) at which the user has performed a tap is known. "element.tagName;" indicates an element name, and "element.type;" indicates a value of a type attribute. In the present embodiment, when the element name is "'input'" and the value of the type attribute is "'file'", it can be determined that the element pressed by the user is a file selection element.

When a result of the determination in step S303 indicates that the element pressed by the user is a file selection element, the processing proceeds to step S304. Meanwhile, when a result of the determination in step S303 indicates that the element pressed by the user is not a file selection element, the processing proceeds to step S311.

In step S304, the file selection notification unit 221 transmits information of the pressed element to the communication apparatus 201 via the transmission/reception unit 210.

The information of the pressed element may be a character string of a structured document, such as "<input type, 'file'>", or may be a structure expressed in a program. It becomes possible to determine the pressed element by determining, in advance, a correspondence between information and a type of an element to be transmitted and received between the communication apparatus 201 and the image generation system 203.

Figures 9A, 9B:
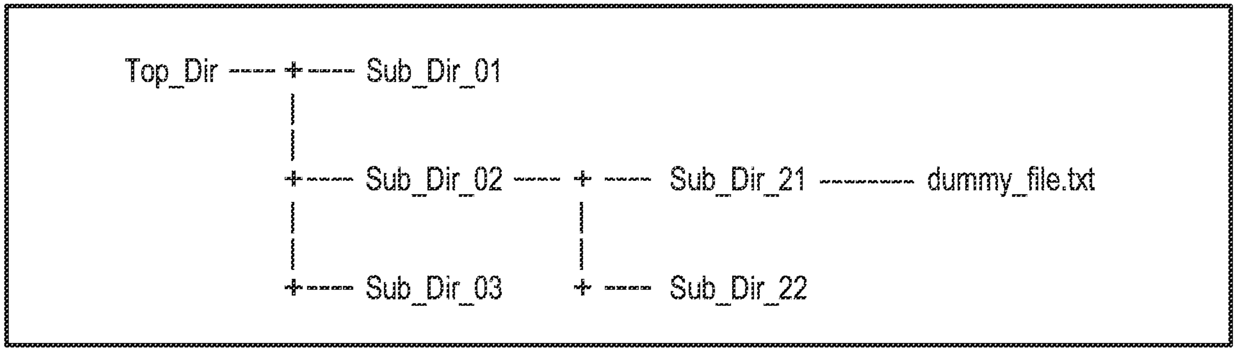
FIGS. 9A to 9B are diagrams illustrating examples of data to be transmitted and received to and from the image generation system and the communication apparatus according to the embodiment.

Here, a method of determining a correspondence between information and a type of an element to be transmitted and received will be described with reference to FIG. 9B. FIG. 9B includes a key column, a value column, and a description column. The key column indicates an attribute of information, and the value column indicates a value of that attribute. Assume that both the communication apparatus 201 and the image generation system 203 stores the table in FIG. 9B.

For example, assume that in step S304, the file selection notification unit 221 transmits a character string "key=Element, value=File" to the communication apparatus 201 via the transmission/reception unit 210. In this case, when the description column of "key=Element, value=File" is referenced, it is described that "the pressed element is a file selection element". Therefore, the communication apparatus 201 can recognize that on the image generation system 203 side the browser 206 has determined that the element pressed by the user is a file selection element.

In step S305, the transmission/reception unit 210 determines whether a file has been received from the communication apparatus 201 (file reception determination). When a result of the determination in step S305 indicates that a file has not been received, the processing proceeds to step S306 and waits. Meanwhile, when a result of the determination in step S305 indicates that a file has been received, the processing proceeds to step S307. In the present embodiment, the file received in step S305 is stored in a storage region of the virtual machine 205.

In step S307, the file information reflection unit 208 reflects information of the file received in step S305 in the web page.

Here, a method of reflection in step S307 will be described with reference to FIG. 5C. In FIG. 5C, "g_signal_connect( )" is a function for registering a callback function that is fired in connection with a particular signal being emitted. In FIG. 5C, a function "fileChooser_cb( )" is called when a "'run-file-chooser'" signal is emitted. The run-file-chooser signal is a signal that is emitted when the browser 206 determines that file selection is to be performed.

Next, "filesToSelect" in "fileChooser_cb( )" is a variable for storing the file name received in step S305. In the present embodiment, assume that the file name received in step S305 is "dummy_file.txt". "webkit_file_chooser request_select_files( )" is a function for reflecting in the web page the file name set in an argument. By executing this function, "dummy_file.txt" can be displayed on the web page. With the processing of FIG. 5C, information (e.g., a file name) of a file can be reflected in the web page in the same manner as in the operation of the web standard specification illustrated in FIGS. 8A to 8C. Further, since data of the file selected by the user is received and stored in step S305, processing for uploading the file or the like can be executed according to a user operation.

In step S308, the rendering result generation unit 209 generates a rendering result based on the reflection result of step S307 and transmits the rendering result to the communication apparatus 201 (rendering result transmission). In step S309, the browser 206 determines whether web page viewing has ended. When a result of the determination in step S309 indicates that the web page viewing has ended, the processing proceeds to step S310. Meanwhile, when a result of the determination in step S309 indicates that the web page viewing has not ended, the processing returns to step S302.

In step S310, the image generation system 203 deletes the file received in step S305 from the storage region of the virtual machine 205. In step S310, the file is deleted in view of information confidentiality. Therefore, when the file received in step S305 is to be continuously used in the virtual machine 205, the file need not be deleted.

In step S311, the pressed element determination unit 207 notifies the browser 206 of the user's operation instruction (operation instruction other than the file selection operation) received in step S302. In step S312, the transmission/reception unit 210 transmits information of the pressed element to the communication apparatus 201. Then, the processing proceeds to step S308. This concludes the series of processes illustrated in FIG. 3.

Next, the flow of processing on the communication apparatus 201 side will be described with reference to FIG. 4. In step S401, the communication apparatus 201 activates the dedicated viewer 214 after connecting with the image generation system 203. There are two main functions of the dedicated viewer 214. One is a function for displaying a rendering result received from the image generation system 203. The other is a function for accepting the user's operation instruction and transmitting the operation instruction to the image generation system 203.

In step S402, the dedicated viewer 214 transmits the user's operation instruction to the image generation system 203 via the transmission/reception unit 212 (instruction transmission). Information of the operation instruction transmitted in step S402 is received in step S302 of the flow of processing on the image generation system 203 side.

In step S403, the transmission/reception unit 212 determines whether information of the element pressed by the user has been received from the image generation system 203. When a result of the determination in step S403 indicates that information of the element pressed by the user has been received, the processing proceeds to step S404. Meanwhile, when a result of the determination in step S403 indicates that information of the element pressed by the user has not been received, the processing proceeds to step S410. Aside from the information of the pressed element, the communication apparatus 201 may receive a rendering result from the image generation system 203.

In step S404, the communication apparatus 201 determines whether the pressed element received in step S403 is a file selection element. When a result of the determination in step S404 indicates that the pressed element is a file selection element, the processing proceeds to step S405. Meanwhile, when a result of the determination in step S404 indicates that the pressed element is not a file selection element, the processing proceeds to step S409.

In step S405, the file browsing function call unit 213 displays a file browsing screen. An example of a file browsing screen is the screen 802 of FIG. 8B. A display result, such as in FIG. 8B, can be outputted to a screen of the display unit 211 by the file browsing screen being displayed over a state in which the dedicated viewer 214 is displaying a rendering result.

In step S406, the communication apparatus 201 receives a selection of a file from the user. Then, in step S407, the transmission/reception unit 212 transmits the selected file to the image generation system 203 (file transmission).

In step S408, the communication apparatus 201 determines whether the user has terminated the use of the image generation system 203 (a cloud browser). When a result of the determination in step S408 indicates that the user has terminated the use of the image generation system 203 (the cloud browser), the series of processes are terminated. Meanwhile, when a result of the determination in step S408 indicates that the user continues the use of the image generation system 203 (the cloud browser), the processing returns to step S402.

In step S409, the communication apparatus 201 performs processing corresponding to the pressed element. An example of processing corresponding to step S409 includes processing in which the display unit 211 displays a software keyboard on a screen of the communication apparatus 201.

In step S410, the communication apparatus 201 determines whether a rendering result has been received from the image generation system 203 (rendering result reception determination). When a result of the determination in step S410 indicates that a rendering result has been received, the processing proceeds to step S411. Meanwhile, when a result of the determination in step S410 indicates that a rendering result has not been received, the processing proceeds to step S408. In step S411, the display unit 211 displays the rendering result on a screen. Then, the processing proceeds to step S408.

As described above, in the present embodiment, when the user presses a file selection element on a screen of a web page provided by an image generation system functioning as a cloud browser, a communication apparatus belonging to the user displays a file selection screen. This file selection screen is displayed on the communication apparatus by a folder or a file stored in the communication apparatus being read out. Then, in response to the user selecting a file stored in the communication apparatus, the file is transmitted to the image generation system.

This makes it possible for the image generation system to obtain a folder, a file, and information (e.g., a file name) related to the file stored in the communication apparatus, which are not originally stored. The image generation system reflects information in a file selection result in the web page using the obtained folder, file, information related to the file, and the like. Therefore, it becomes possible for the image generation system to display a selection result such as in FIG. 8C, also making it possible to perform processing such as uploading a selected file according to the user's instruction.

As described above, according to the present embodiment, in an image generation system serving as a cloud browser, it is possible for the user to select a file stored in a communication apparatus and reflect in a web page the file selected by the user.

Second Embodiment

In the present embodiment, an example in which file selection is made possible by the image generation system receiving file structure information from a remote communication apparatus, reproducing a file structure in the virtual machine based on the file structure information, and using the file viewing function of the virtual machine will be described.

The system configuration and the apparatus configuration are similar to the configurations described in the first embodiment, and so descriptions thereof will be omitted.

Processing

Figure 6:
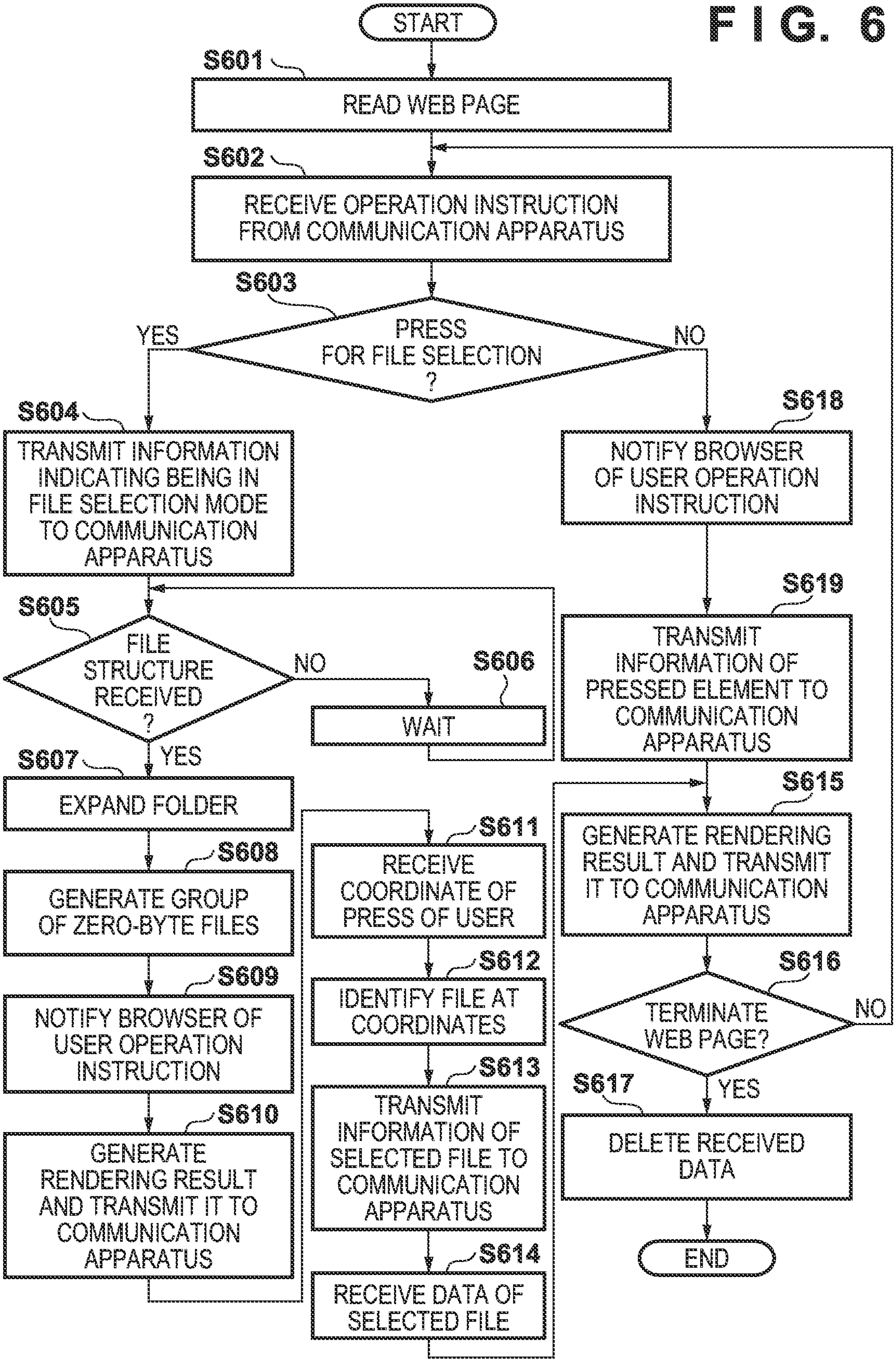
FIG. 6 is a flowchart for explaining a flow of processing of the image generation system according to a second embodiment.

FIGS. 6 and 7 are flowcharts of the present embodiment. FIG. 6 is a flow of processing on the image generation system 203 side according to the present embodiment. FIG.

7 is a flow of processing on the communication apparatus 201 side according to the present embodiment.

First, the flow of processing on the image generation system 203 side will be described with reference to FIG. 6. In FIGS. 6 and 3, steps S601 and S301, steps S602 and S302, steps S603 and S303, steps S618 and S311, steps S619 and S312 are the same processes, and so descriptions thereof will be omitted.

In FIG. 6, when a result of the determination in step S603 indicates that a file selection element has been pressed, the processing proceeds to step S604. Meanwhile, when a result of the determination in step S603 indicates that a file selection element has not been pressed, the processing proceeds to step S618.

In step S604, the transmission/reception unit 210 transmits information indicating that a mode is a file selection mode to the communication apparatus 201. Here, the information indicating that a mode is a file selection mode will be described with reference to FIG. 9B. When FIG. 9B is referenced, it can be seen that when the information transmitted and received between the communication apparatus 201 and the image generation system 203 is "key=Mode, value=FileSelect", the mode is in the file selection mode. In step S604, a character string "key=Mode, value=FileSelect" is transmitted from the image generation system 203 to the communication apparatus 201.

In step S605, the image generation system 203 determines whether file structure information has been received by the transmission/reception unit 210 (configuration information reception determination). When a result of the determination in step S605 indicates that file structure information has not been received, the processing proceeds to step S606 and waits. Meanwhile, when a result of the determination in step S605 indicates that file structure information has been received, the processing proceeds to step S607. In the present embodiment, the file structure information received in step S605 is stored in a storage region of the virtual machine 205.

Here, an example of file structure information will be described with reference to FIG. 9A. FIG. 9A illustrates a structure of files on the communication apparatus 201. A top folder of the communication apparatus 201 is Top_Dir, and Top_Dir contains three folders: Sub_Dir_01, Sub_Dir_02, and Sub_Dir_03. Sub_Dir_02 contains two folders: Sub_Dir_21 and Sub_Dir_22. Sub_Dir_21 contains a file called "dummy_file.txt". In the present embodiment, assume that the user wishes to select "dummy_file.txt" using the file browsing function. A description format of the file structure information may be expressed as a string such as a structured document, or may be expressed as a structure in a program.

In step S607, the file structure expansion unit 220 expands in the virtual machine 205 the file structure information received in step S605. When FIG. 9A is used as an example, Top_Dir is generated first, and Sub_Dir_01, Sub_Dir_02, and Sub_Dir_03 are generated in Top_Dir. Then, Sub_Dir_21 and Sub_Dir_22 are generated in Sub_Dir_02.

Next, in step S608, the file structure expansion unit 220 generates a zero-byte, empty file. In FIG. 9A, a zero-byte "dummy_file.txt" is created in the folder Sub_Dir_21. The processing in steps S607 and S608 makes it possible to view the same folder structure as that of the communication apparatus 201 when the file browsing function of the virtual machine 205 is activated.

Next, in step S609, the file structure expansion unit 220 notifies the browser 206 of the user's operation instruction of the communication apparatus 201 received in step S602. In response, the browser 206 activates the file browsing function of the virtual machine 205. The browser 206 is equipped with a function for calling the file browsing function as a standard, and so the file browsing function call unit is unnecessary in the virtual machine 205.

In step S610, the rendering result generation unit 209 of the virtual machine 205 generates a rendering result and transmits the rendering result to the communication apparatus 201. The rendering result at this time is a visual representation of a file structure in which a group of folders and files expanded and generated by the file browsing function of the virtual machine 205 from the file structure information are visually represented (visual representation transmission).

In step S611, the transmission/reception unit 210 receives information of the user's press (such as press coordinates) from the communication apparatus 201 (coordinate reception). In step S612, the browser 206 identifies a file present at the press coordinates at which the user has performed a press. At this time, the browser 206 has activated the file viewing function of the virtual machine 205 in step S609, and so in step S612, a file desired by the user can be identified by notifying the virtual machine 205 of the press information received in step S611.

Assume that a file selected by the user is dummy_file.txt. In step S612, the browser 206 applies dummy_file.txt to the web page using standard file selection element processing. At this point in time, dummy_file.txt selected on the virtual machine 205 is a zero-byte, empty file generated in step S608. When the processing of the web page proceeds as is, the zero-byte data is notified to the web page side, and so data of "dummy_file.txt" is obtained from the communication apparatus 201.

In step S613, the transmission/reception unit 210 transmits information of the file identified in step S612 to the communication apparatus 201 (information transmission). The information to be transmitted in step S613 may be, for example, a file name. In the present embodiment, assume that a character string to be transmitted is "dummy_file.txt".

Next, in step S614, the transmission/reception unit 210 receives data of the selected file from the communication apparatus 201. In step S614, data of "dummy_file.txt" present in the communication apparatus 201 is received. The zero-byte, empty data until that point is replaced with the received data of "dummy_file.txt". Then, the processing proceeds to step S615.

In step S615, the rendering result generation unit 209 generates a rendering result and transmits the rendering result to the communication apparatus 201 via the transmission/reception unit 210. In step S616, the image generation system 203 determines whether the user has terminated the use of the web page. When a result of the determination in step S616 indicates that the user has terminated the use of the web page, the processing proceeds to step S617.

In step S617, the image generation system 203 deletes the file structure information received in step S605 and the data of the selected file received in step S614 from the virtual machine 205. Then, a series of processes are terminated. Meanwhile, when a result of the determination in step S616 indicates that the user continues the use of the web page, the processing returns to step S602.

Next, a flow of processing of the communication apparatus 201 according to the present embodiment will be described using FIG. 7. In FIGS. 7 and 4, steps S701 and S401, steps S702 and S402, steps S703 and S403, steps S709 and S409, steps S710 and S410 are the same processes, and so descriptions thereof will be omitted.

In step S704, the transmission/reception unit 212 of the communication apparatus 201 determines whether information identifying the file selection mode has been received. When a result of the determination in step S704 indicates that information identifying the file selection mode has been received, the processing proceeds to step S705. Meanwhile, when information identifying the file selection mode has not been received, the processing proceeds to step S707.

Here, an example of information identifying the file selection mode will be described with reference to FIG. 9B. When FIG. 9B is referenced, it can be seen that when the information transmitted and received between the communication apparatus 201 and the image generation system 203 is "key=Mode, value=FileSelect", the mode is in the file selection mode.

In step S705, the transmission/reception unit 213 of the communication apparatus 201 transmits folder structure information to the image generation system 203. Here, an example of folder structure information is as illustrated in FIG. 9A. In step S706, the communication apparatus 201 determines whether the user has terminated the use of the browser. When a result of the determination in step S706 indicates that the user has terminated the use of the browser, the processing is terminated. Meanwhile, when the user continues the use of the browser, the processing returns to step S702.

In step S707, the communication apparatus 201 determines whether a file selection result has been received. Here, an example of a file selection result will be described with reference to FIG. 9B. When FIG. 9B is referenced, when "key=SelectedFile, value=[File Name]", it can be seen that it is a file selection result. In step S707, when key=SelectedFile in the information received by the transmission/reception unit 213, a selected file can be identified by confirming the value. When a result of the determination in step S707 indicates that a file selection result has been received, the processing proceeds to step S708. Meanwhile, when a result of the determination in step S707 indicates that a file selection result has not been received, the processing proceeds to step S709.

In step S708, the communication apparatus 201 compresses a file corresponding to "File Name" of "value=[File Name]" and transmits the file from the transmission/reception unit 213 to the image generation system 203. The processing in step S709 is the same as the processing in step S409.

As described above, in the present embodiment, a cloud browser receives file structure information of a remote communication apparatus from the remote communication apparatus, and reproduces a file structure on a virtual machine based on the received file structure information. This makes it possible for the user to select a file using a file browsing function of the virtual machine and, furthermore, makes it possible to perform upload processing and the like using data of the received file.

According to the present disclosure, a file on a communication apparatus can be selected by the user in an image generation system.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-099798, filed Jun. 21, 2022, which is hereby incorporated by reference herein in its entirety.

What is claimed is:

1. An image generation system functioning as a cloud browser and capable of communicating with a communication apparatus, the image generation system comprising:

one or more memories; and one or more processors in communication with the one more memories, wherein the one or more processors and the one more memories are configured to:

receive an operation instruction with respect to a web page from the communication apparatus, wherein the operation instruction includes information indicating an attribute of the operation instruction;

transmit, to the communication apparatus, predetermined information when the operation instruction is a press for file selection, wherein the predetermined information includes information of a pressed element and information indicating being in a file selection mode;

receive file structure information transmitted from the communication apparatus based on the information indicating being in the file selection mode;

reproduce a visual representation of a file structure that corresponds to that of the communication apparatus by expanding a folder and generating a group of files based on the file structure information, wherein the group of files are a group of zero-byte files, and transmit the visual representation to the communication apparatus;

receive, from the communication apparatus, information of coordinates of a press of a user with respect to the visual representation;

identify information on a file present at the coordinates of the press;

transmit the information of the identified file to the communication apparatus, wherein the information of the identified file includes a file name;

receive data of the identified file transmitted from the communication apparatus;

replace the group of zero-byte data files with the received data of the identified file; and generate a rendering result that reflects the received data of the identified file and transmit the rendering result to the communication apparatus.

2. The image generation system according to claim 1, wherein the one or more processors and the one more memories are further configured to delete information received from the communication apparatus when a user terminates use of the image generation system via the communication apparatus.

3. A method of operating an image generation system functioning as a cloud browser and capable of communicating with a communication apparatus, the method comprising:

receiving from the communication apparatus an operation instruction with respect to a web page, wherein the operation instruction includes information indicating an attribute of the operation instruction;

transmitting, to the communication apparatus, predetermined information when the operation instruction is a press for file selection, wherein the predetermined information includes information of a pressed element and information indicating being in a file selection mode;

receiving file structure information transmitted from the communication apparatus based on the information indicating being in the file selection mode;

reproducing a visual representation of a file structure that corresponds to that of the communication apparatus by expanding a folder and generating a group of files based on the file structure information, wherein the group of files are a group of zero-byte files, and transmitting the visual representation to the communication apparatus;

receiving, from the communication apparatus, information of coordinates of a press of a user with respect to the visual representation;

identifying information on a file present at the coordinates of the press;

transmitting the information of the identified file to the communication apparatus, wherein the information of the identified file includes a file name;

receiving data of the identified file from the communication apparatus;

replacing the group of zero-byte data files with the received data of the identified file;

and generating a rendering result that reflects the received data of the identified file and transmitting the rendering result to the communication apparatus.

* * * * *